(12) United States Patent
Cooper et al.

(10) Patent No.: US 11,151,580 B2
(45) Date of Patent: Oct. 19, 2021

(54) INTELLIGENT TOE CAP

(71) Applicant: TBL Licensing LLC, Stratham, NH (US)

(72) Inventors: Benjamin Cooper, Dover, NH (US); Tadd Nicholas Smith, Rye, NH (US)

(73) Assignee: TBL Licensing LLC, Stratham, NH (US)

( * ) Notice: Subject to any disclaimer, the term of this patent is extended or adjusted under 35 U.S.C. 154(b) by 414 days.

(21) Appl. No.: 16/306,407

(22) PCT Filed: Jun. 1, 2017

(86) PCT No.: PCT/US2017/035369
§ 371 (c)(1),
(2) Date: Nov. 30, 2018

(87) PCT Pub. No.: WO2017/210384
PCT Pub. Date: Dec. 7, 2017

(65) Prior Publication Data
US 2020/0320544 A1    Oct. 8, 2020

Related U.S. Application Data

(60) Provisional application No. 62/344,676, filed on Jun. 2, 2016.

(51) Int. Cl.
*A43B 3/00* (2006.01)
*G06K 7/10* (2006.01)
*G06K 19/07* (2006.01)
*G06K 19/077* (2006.01)
*G08B 7/06* (2006.01)
(Continued)

(52) U.S. Cl.
CPC ....... *G06Q 30/0185* (2013.01); *A43B 3/0005* (2013.01); *G06K 7/10366* (2013.01); *G06K 19/0723* (2013.01); *G06K 19/07758* (2013.01); *G06Q 50/265* (2013.01); *G08B 7/06* (2013.01)

(58) Field of Classification Search
None
See application file for complete search history.

(56) References Cited

U.S. PATENT DOCUMENTS

2007/0152829 A1    7/2007  Lindsay et al.

FOREIGN PATENT DOCUMENTS

CA    3026408 A1    12/2017
CN    109565300 A    4/2019
(Continued)

OTHER PUBLICATIONS

International Preliminary Report on Patentability received for PCT Patent Application No. PCT/US2017/035369, dated Dec. 13, 2018, 8 pages.
(Continued)

*Primary Examiner* — Kristy A Haupt
(74) *Attorney, Agent, or Firm* — Smith, Gambrell & Russell LLP

(57) ABSTRACT

System and methods for managing compliance of a wearer of apparel are disclosed. One method includes receiving an identifier associated with a toe cap for footwear; receiving, via radio frequency, characteristic information associated with the toe cap for footwear; determining a compliance of the toe cap based at least on the identifier and the characteristic information; and providing a response to a wearer of the footwear based at least upon the determination of the compliance.

20 Claims, 5 Drawing Sheets

(51) Int. Cl.
G06Q 30/00 (2012.01)
G06Q 50/26 (2012.01)

(56) References Cited

FOREIGN PATENT DOCUMENTS

| | | |
|---|---|---|
| DE | 102014209009 A1 | 7/2015 |
| EP | 0239313 A2 | 9/1987 |
| EP | 2388755 A1 | 11/2011 |
| EP | 3465924 A1 | 4/2019 |
| JP | 62-281901 A | 12/1987 |
| JP | 2016-042649 A | 3/2016 |
| JP | 2019-532525 A | 11/2019 |
| KR | 10-2014-0128441 A | 11/2014 |
| KR | 10-2015-0039467 A | 4/2015 |
| KR | 10-2019-0012212 A | 2/2019 |
| WO | 20091032417 A1 | 3/2009 |
| WO | 20171210384 A1 | 12/2017 |

OTHER PUBLICATIONS

International Search Report and Written Opinion received for PCT Patent Application No. PCT/US2017/035369, dated Sep. 12, 2017, 10 pages.

INTELLIGENT TOE CAP

CROSS-REFERENCE TO RELATED APPLICATION

This application is the National Stage of International Application No. PCT/US2017/035369, filed Jun. 1, 2017, which claims the benefit of U.S. Provisional Application No. 62/344,676 filed Jun. 2, 2016, the disclosures of which are incorporated herein by this reference in their entireties.

TECHNICAL FIELD

This patent disclosure relates generally to sensing technology for apparel and more particularly to methods and systems for sensing various characteristics relating to apparel and wearers of the same.

BACKGROUND

Apparel is often worn to offer protection for the wearer and to provide insulation for warming a wearer's body. Wearers may select particular apparel based upon environmental conditionals, such as, temperature, wind, and precipitation. Often, apparel is personal to the wearer and may signal and express aspects of the wearer such as mood, hobbies, status, etc. As such, wearers adorn different kinds of clothes and shoes, such as, casual, formal, fashionable, underwear, outerwear, etc.

Recent developments in apparel include smart clothing. Smart clothing or digital clothing describes combining clothing with information technology. This includes the incorporation of digital devices as part of the clothing. The digital devices may be contained in the clothing, or attachable to the clothing. However, improvements in smart clothing are needed.

SUMMARY

This patent disclosure relates to system and methods for sensing various characteristics relating to apparel and wearers of the same. In an aspect, a method may include receiving an identifier associated with a toe cap for footwear; receiving, via radio frequency, characteristic information associated with the toe cap for footwear; determining a compliance of the toe cap based at least on the identifier and the characteristic information; and providing a response to a wearer of the footwear based at least upon the determination of the compliance.

In another aspect, a system may include a memory comprising one or more compliance rules and processor executable instructions; a processor in communication with the memory, the processor configured to: receive an identifier associated with a toe cap for footwear; receive, via radio frequency, characteristic information associated with the toe cap for footwear; determine a compliance of the toe cap based at least on the identifier and the characteristic information; and provide a response to a wearer of the footwear based at least upon the determination of the compliance.

DETAILED DESCRIPTION

In accordance with aspects of the disclosure, systems and methods provide a tool for determining characteristics of apparel such as footwear and footwear accessories. As an example, one or more items of apparel such as footwear may include a sensor configured to communicate a characteristic of the footwear. Such information may be transmitted to a computing device for additional processing. In certain aspects, the sensor may communicate (actively or passively/responsively) measured information to a user device such as a mobile device. As such, the user device may be configured to process the measured data and/or to transmit the measured data over a network or communication path for processing. However, various configurations of sensors, computing devices, and communication mechanisms may be used, as described in further detail below.

The term "apparel" may be defined as one or more article of clothing and may include outerwear, underwear, upper body wear, lower body wear, hats, gloves, footwear, and the like. The term "clothing" may be used to reference apparel and is not limiting to particular garments, headgear, gloves, footwear, or the like.

Figure 1:
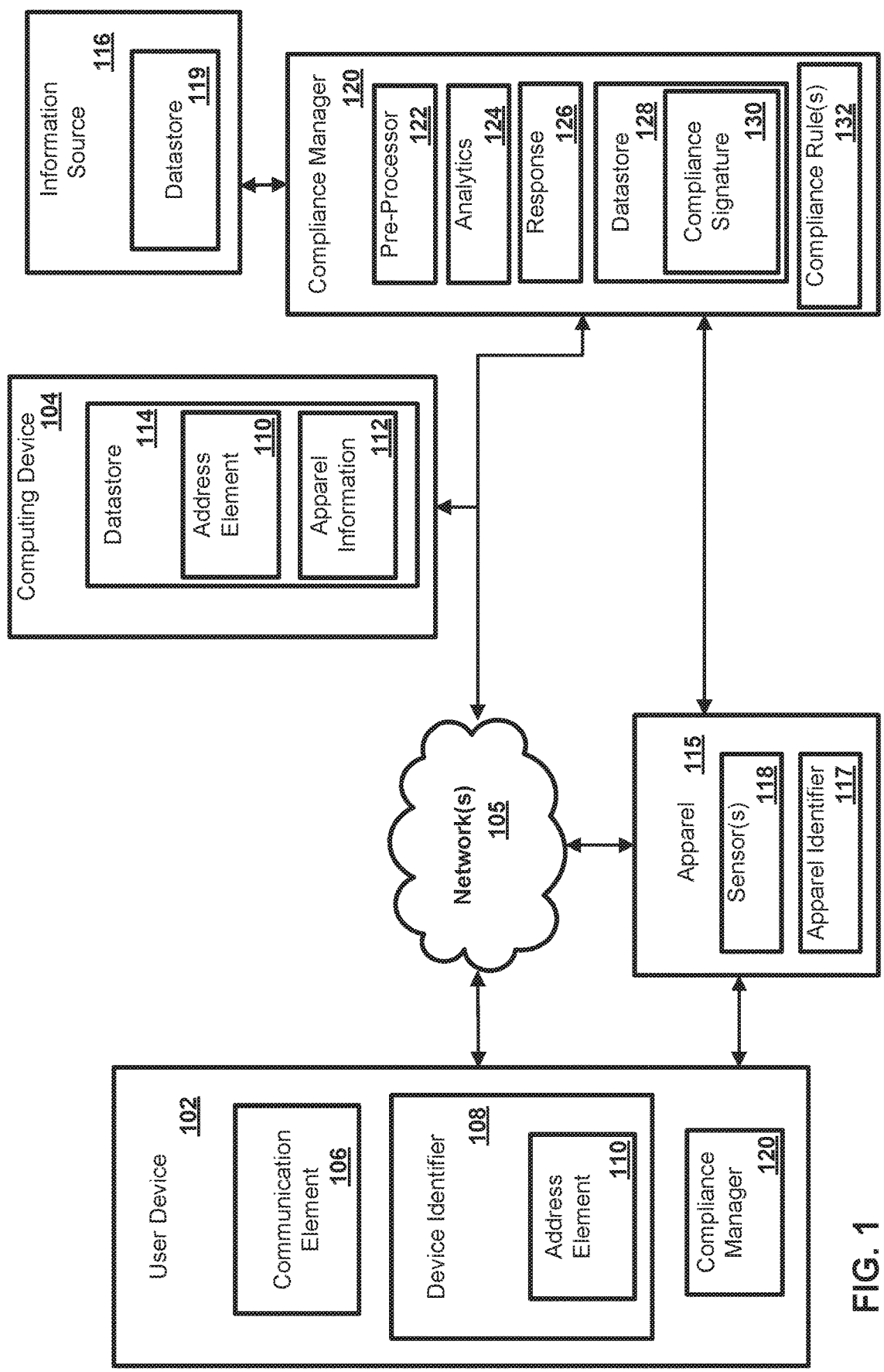
FIG. 1 is a block diagram of an example system and network in accordance with aspects of the disclosure.

FIG. 1 illustrates various aspects of an exemplary network in which the present methods and systems may operate. Those skilled in the art will appreciate that present methods may be used in various types of networks and systems that employ both digital and analog equipment. The system is described as comprised of elements. An element may be software, hardware, or a combination of software and hardware. One skilled in the art will appreciate that provided herein is a functional description and that the respective functions may be performed by software, hardware, or a combination of software and hardware.

The system and network may include a user device 102 (e.g., physical computer host, virtual machine, IP-capable device) in communication with a computing device 104 such as a server or Network Interface Device (NID), for example. The computing device 104 may be disposed locally, or remotely, relative to the user device 102. As an example, the user device 102 and the computing device 104 may be in communication via a private and/or public network 105 such as the Internet. Other forms of communications may be used such as wired and wireless telecommunication channels, for example.

In an aspect, the user device 102 may be an electronic device such as a computer, a an RF reader, a mobile device, a smartphone, a laptop, a tablet, a display device, or other device capable of communicating with the computing device 104. The user device 102 may be configured to communicate information relating to one or more items of clothing (apparel) and/or wearers of the same. The user device 102 may be configured to determine and communicate information relating to another device such as a sensor 118 disposed in or adjacent the apparel. In certain aspects, the user device 102 (e.g., RF reader) may transmit a signal (e.g., RF signal) toward the sensors 118, which may be configured with an electromagnetically induced material (EIM) such as an antenna to be responsive to the signal. The response signal may be representative of a state or characteristic of the apparel 115.

For example, the user device 102 may be or comprise a mobile computing device such as a smart phone, handheld device, or tablet including RF reader. The user device 102 may also be operatively coupled to one or more networks such as an IP network, a cellular network, near-field network, Bluetooth, ZigBee, or other network specification or protocol. The user device 102 may communicate with the sensor 118 to send and receive signals, for example, using radio frequency (RF) communication. In certain aspects, the user device 102 is configured to receive information from the sensor 118 relating to a characteristic of an item of apparel 115. The characteristics may be resented by a returned signal form. As an example, various states of the apparel 115 may be represented by compliance signatures 130 such as a datastore 128 of representative signal forms or waveforms. Such states and characteristic may include a safety characteristic/state, a compliance characteristic/state, integrity of the apparel 115, and the like. The user device 102 may be configured to communicate with other devices such as the computing device 104. The user device 102 may receive information from the sensor 118 and may transmit the information to the computing device 104.

The user device 102 may include a communication element 106 for providing an interface to a user to interact with the user device 102 and/or the computing device 104. The communication element 106 may be any interface for presenting information to the user and receiving user feedback, such as a web browser (e.g., Internet Explorer, Mozilla Firefox, Google Chrome, Safari, or the like) or proprietary software, for example. Other software, hardware, and/or interfaces may be used to provide communication between the user and one or more of the user device 102 and the computing device 104. As an example, the communication element 106 may request or query various files from a local source and/or a remote source. As a further example, the communication element 106 may transmit data to a local or remote device such as the computing device 104.

In an aspect, the user device 102 may be associated with a user identifier or device identifier 108. As an example, the device identifier 108 may be any identifier, token, character, string, or the like, for differentiating one user or user device (e.g., user device 102) from another user or user device. In a further aspect, the device identifier 108 may identify a user or user device as belonging to a particular class of users or user devices. As a further example, the device identifier 108 may include information relating to the user device, such as a manufacturer, a model or type of device, a service provider associated with the user device 102, a state of the user device 102, a locator, and/or a label or classifier. Other information may be represented by the device identifier 108. The device identifier 108 may be used for authentication of a user/user device to manage access to particular services or information.

In an aspect, the device identifier 108 may include an address element 110 such as an internet protocol address, a network address, an Internet address, or the like. As an example, the address element 110 may be relied upon to establish a communication session between the user device 102 and the computing device 104 or other devices and/or networks. As a further example, the address element 110 may be used as an identifier or locator of the user device 102.

In an aspect, the computing device 104 may be a server for communicating with the user device 102, other computing devices 104, and/or physical or logical components including, for example, sensors (e.g., sensor 118). As an example, the computing device 104 may communicate with the user device 102 for providing services such as peer-to-peer communication and compliance management services. In an aspect, the computing device 104 may allow the user device 102 to interact with remote resources, such as data, devices, files, and computing elements associated with one or more users or items of apparel 115. As an example, the computing device may be configured as computing module for a particular item of apparel 115. As such, the user device 102 may interact with the computing device 104 to control functions relating to the apparel 115.

In an aspect, the computing device 104 may manage the communication between the user device 102 and a datastore 114 for sending and receiving data therebetween. As an example, the datastore 114 may store a plurality of files, webpages, user identifiers or records, or other information. As a further example, the user device 102 may request and/or retrieve a file from the datastore 114. In an aspect, the datastore 114 may store information relating to the user device 102, such as the address element 110 and/or apparel information 112. Apparel information 112 may include identifiers of certain items of clothing (e.g., smart apparel), the number and/or types of sensing technology associated with the apparel, measured information from the sensor 118 or other information source, user data such as a location, habits, preferences, and the like. Apparel information 112 may include certifications, standards, performance metrics/claims and the like for apparel and/or location based compliance where the apparel may be worn. As an example, various premises and/or location may have compliance standards for apparel worn by users in the area. Such compliance standards may be stored and updated at the computing device 104 or other device. Any information may be stored in and retrieved from the datastore 114. The datastore 114 may be disposed remotely from the computing device 104 and accessed via direct or indirect connection. The datastore 114 may be integrated with the computing device 104 or some other device or system. Furthermore, additional components such as the compliance manger 120 may be integrated with or hosted by the computing device 104.

As described herein, various items of apparel 115 may be configured to receive or access information such as to operate as a "smart" sensing technology. As an example, the apparel 115 may include an apparel identifier 117 such as a chip or RFID tag configured to communicate identifiable information that is unique to the apparel. As another example, the apparel 115 may include one or more of the sensors 118 (e.g., EIM) for continuously or periodically measuring characteristics of the apparel 115, wearer, and/or environment of the same. Characteristics may include compliance characteristics such as integrity of a toe cap, for example. Accordingly, the sensors 118 may be or include an electromagnetically induced material (EIM) configured as an antenna to be responsive to RF signals. In other embodiments, the sensors may be active sensors 118 configured to transmit characteristics.

The sensors 118 may have any size and may be powered actively or passively. For example, the sensors 118 may be RF antenna configured to respond to electromagnetic radiation without require a dedicated power source. However, other active approaches may be used and the sensors 118 may include various energy sources such as stored energy (e.g., cell battery), kinetic energy devices, solar energy device, and the like. The sensors 118 may include cache or memory to store an amount of collected information. Alternatively, the sensors 118 may be dumb sensors 118 without integrated memory or processing. The sensors 118 may include a processor and/or logic to perform analytics and/or pre-processing on any information collected or received by the sensors 118. The apparel 115 may include any number and configuration of sensors 118.

Figure 2:
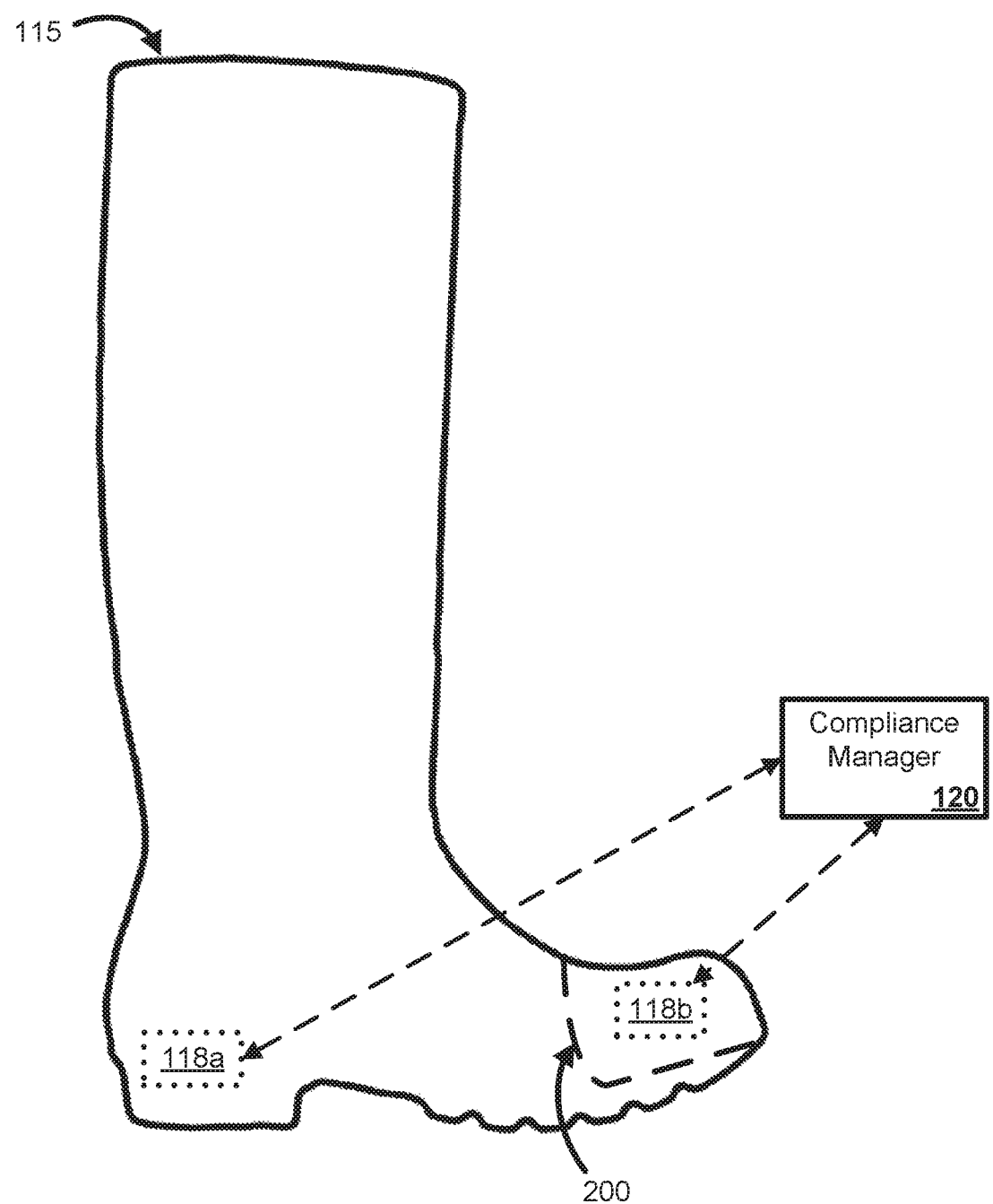
FIG. 2 is a block diagram of an example system and network in accordance with aspects of the disclosure.
Figure 3A:
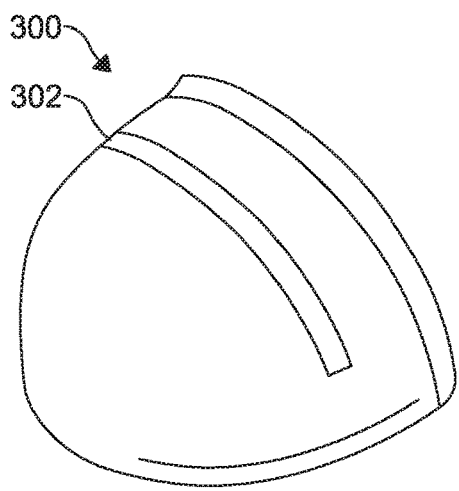
FIGS. 3A-3E are schematic diagrams of example toe caps in accordance with aspects of the disclosure.
Figure 3B:
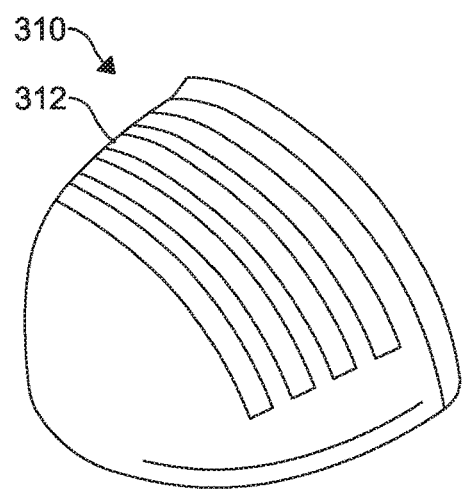
Figure 3C:
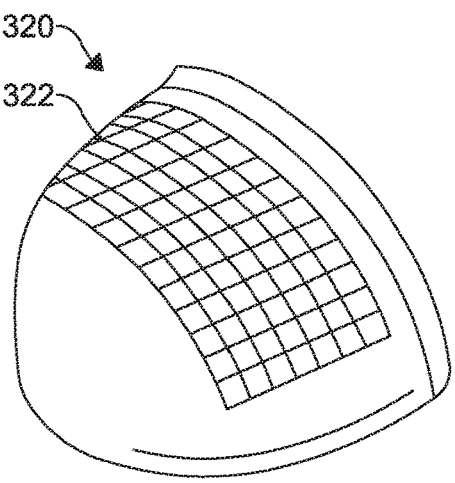
Figure 3D:
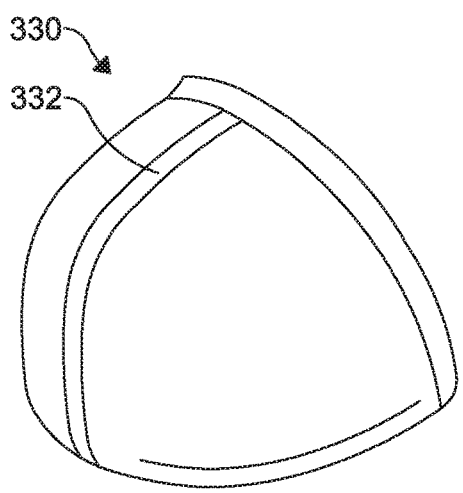
Figure 3E:
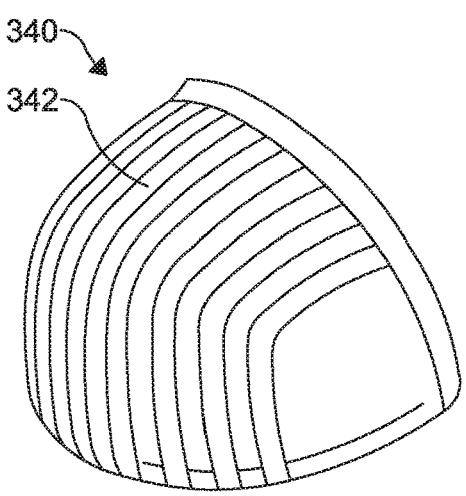

As illustrated in FIG. 2, an example item of apparel 115 (e.g., footwear) may include a plurality of sensors 118*a*, 118*b*. The sensors 118*a*, 118*b* may be in communication with each other or may be isolated from other sensors 118*a*, 118*b*. The sensors 118*a*, 118*b* may be in communication with each other via wireless or wired connection (e.g., conductive ink). The sensors 118*a*, 118*b* may be configured to send and receive information using various communication mechanisms (e.g., RF) and/or over various networks, specifications, and protocols. The sensors 118*a*, 118*b* may be disposed in any location of the item of apparel 115, such as adjacent a toe cap 200. However, other configurations are possible. As a further example, location of the sensors 118*a*, 118*b* may be selected based on a thermal or moisture profile of a user or the item of apparel 115, itself.

Any number and configuration of sensors 118*a*, 118*b* may be used. The sensors 118*a*, 118*b* and connecting leads between the 118*a*, 118*b* may be configured to be washable to allow the apparel to be cleaned without having to detach the sensors 118*a*, 118*b* from the apparel. As discussed herein, the sensors 118*a*, 118*b* may be configured to communication with devices such as the user device 102 over various communication protocols to pass information therebetween.

Certain ones of the sensors 118*a* may be disposed to represent identifiable information (e.g., apparel identifier 117) of the apparel 115. As an example, the sensor 118*a* may be an RFID tag configured to represent the apparel identifier 117 to RF readers in proximity of the sensors 118*a*. Other ones of the sensors 118*b* may be disposed to measure characteristics of the toe cap 200. As an example, the sensors 118*b* may be configured to measure characteristics of integrity of the toe cap 200. Such characteristics may be represented by a response signal form provided by an antenna of the sensors 118*b*. When the toe cap 200 is functioning properly, the sensors 118*b* may provide a first response signal. However, if the toe cap 200 has been compromised, the antenna of the sensors 118*b* may reflect a second response signal indicative of a compromised state of the toe cap 200. As an example, an EIM-type antenna may provide a first response signal in response to an incident interrogation signal. The first response signal may have a signal form based on the uncompromised shape and integrity of each conductive lead forming the antenna. However, if a portion of the EIM-type antenna is compromised (e.g., broken, bent, separated, etc.) the same interrogation signal incident to the compromised antenna will result in a second response signal that is different from the first response signal. As such, the state of the antenna may be used to extrapolate a state of the associated apparel or toe cap 200.

The sensors 118*b* may be disposed on top, underneath, within the toe cap 200, or a combination thereof. A device such as the user device 102 or computing device 104 may be configured to provide an electromagnetic signal to the sensors 118*b*, whereby the sensors 118*b* reflect a signal indicative of the state of the apparel 115 and/or the toe cap 200. Changes to or interruption of the response signal from the antenna may indicate a mechanical change to the structure of the antenna and may interpreted as a particular state of the apparel 115 or toe cap 200. Any number of states may be represented by response signal. Various sensors 118*b* may be configured to generate various response signals. As an example, FIGS. 3A-3E illustrate example toe caps 300, 310, 320, 330, 340 having example configurations of sensors 302, 312, 322, 332, 342 that may be used as sensors 118. As illustrated, an EIM may be configured in many shapes and sizes having various directional coverages. Sensor 302 in FIG. 3A has a lateral or transverse configuration. Sensor 312 in FIG. 3B includes a plurality of antenna configured in generally parallel lateral configuration. Sensor 322 in FIG. 3C includes a network of antenna configured to represent multiple dimensions. Sensor 332 in FIG. 3D includes a longitudinal configuration. Sensors 342 in FIG. 3E includes a plurality of generally parallel longitudinal antenna. As illustrated any number of antenna and configurations of the same may be used to generate various baseline response signal forms.

Returning to FIG. 1, one or more of the information sources 116 may include a datastore 119 for storing information such as information collected or received by the sensors 118. The information sources 116 may include information relating to environmental conditions such as conditions specific to a worksite. For example, the information sources 116 may be associated with a weather service that collects location-based information about temperature and/or precipitation that may affect a compliance standard at a worksite. Such information may be stored at the datastore 119 and/or may be made available for other systems to access or receive. The information sources 116 may perform analytics such as a statistical analysis, heuristics, and/or historical trends that may be used by systems access or receiving such information.

In an aspect, a compliance manager 120 may be configured to receive information from one or more of the user device 102, the computing device 104, the sensors 118, and the information source 116. The compliance manager 120 may be or include hardware and software configured to process received information and provide feedback relating to the received information. Various configurations of hardware and software components may be used. Other components having the same or similar functionality as the compliance manager 120 may be used. The compliance manager 120 may be accessed by one or more of the user devices 102 and the computing devices 104 and by be integrated as hardware or logic into various devices and/or processing elements. The compliance manager 120 may be a standalone component, distinct from the user device 102 and/or computing device 104 or may be integrated in one or more of the user device 102, the computing device 104, or other device or system. Although not every configuration of hardware and logical components is illustrated in the drawings, it is understood that the same is contemplated by the description presented herein.

In an aspect, the compliance manager 120 may include a pre-processor component 122 configured to receive data from various sources such as one or more computing nodes (e.g., computing device 104), the user device 102, the sensors 118, and/or the information source 116. As an example, the pre-processor component 122 may be configured to receive a data dump of information and/or may be configured to process the received or accessed data to filter at least a portion of the received or accessed data. As a further example, the pre-processor component 122 may be configured to filter/classify received information based on one or more parameters such as a compliance standard, location, source identifier, apparel identifier 117, user profile, activity type, activity level, and the like.

The compliance manager 120 may include an analytics component 124 configured to access or receive data (communication flows), for example, from the pre-processing component 122 or other data source. The analytics component 124 may be configured to analyze the received data, for example, using statistical analysis, comparative analysis, heuristics, and/or a machine learning algorithm to assess the current status and/or compliance signature relating to apparel and associated wearers. As an example, the analytics component 124 may be configured to execute one or more operations such as described in FIG. 4. As a further example, the analytics component 124, or one or more other components of the compliance manager 120, may be configured to generate a compliance signature 130 for one or more users/wearers or the apparel 115 based on information received by the compliance manager 120. The compliance signature 130 may be or comprise a signal form or wave form representative of the information received from one or more sensors 118. The compliance signatures 130 may be or comprise an alphanumeric index having values associated with various levels of compliance. The compliance signature 130 may be or comprise a profile having a plurality of parameters representing whether the apparel 115 and/or accessories of the apparel 115 meet certain compliance standards. The compliance signatures 130 may be stored at a datastore 128 and/or other devices or storage such as the user device 102.

The compliance manager 120 may be configured to generate one or more compliance signatures 130 based on one or more compliance rules 132. The compliance rules 132 may include logic to control the analysis of information received by the compliance manager 120. As an example, the compliance rules 132 may include look-up tables (LUTs), IF-THEN relationships, key-value pairs, weighting algorithms, machine learning, heuristics, or other mechanism to aide in the generation of the compliance signatures 130. Such rules may be stored in any location such as the datastore 128.

A response component 126 may be configured to provide assessments and recommendations based on the analysis conducted by the analytics component 124. The assessments and recommendation may include a compliance summary, updates to the predictive compliance model, apparel recommendations, and updates to user or apparel profiles. Received or accessed information, classifications, statistics, and/or remediation logs may be stored in the datastore 128. The response component 126 may be configured to autonomously update information relating to one or more items of apparel and associated users/wearers.

The response component 126 may be configured to provide a user interface element to a wearer, for example, via the user device 102 or other device. Such a user interface element may include audio feedback, visual feedback, tactile feedback, and the like. The user interface element may indicate an instruction to the user/wearer to manipulate the apparel to change compliance. The user interface element may indicate a particular item of apparel to be worn. The user interface element may indicate a notice to the user/wearer relating to compliance state and/or factors that may affect compliance. The user interface element may indicate a request for feedback from the user.

The compliance signatures 130 may be generated based at least on information relating to a particular user/wearer. For example, a user profile or information relating to a particular user/wearer may be received or accessed by the compliance manager 120. The user profile may include information such as location, activity level, user schedule, and user preferences. Compliance signatures 130 may be generated based on one or more categories of information in the user profile. As an example, compliance signatures 130 may be generated based on various locations where the wearer is or will be located.

The compliance signature 130 may be generated based on one or more compliance rules 132. As an example, the compliance rules 132 may represent standard guidelines for apparel compliance associated with a worksite or activity. Various compliance rules 132 may be established by various entities and/or users and may be adjusted and/or applied in various manners.

The application of compliance rules 132 and resultant compliance signatures 130 may be localized to a single item of apparel 115, or wearer, or region including one or more items of apparel 115 and wearers. The application of compliance rules 132 and resultant compliance signatures 130 may be "globalized" to represent a plurality of items of apparel 115 and wearers such as an aggregate over a larger region having one or more sub regions.

Methods

Figure 4:
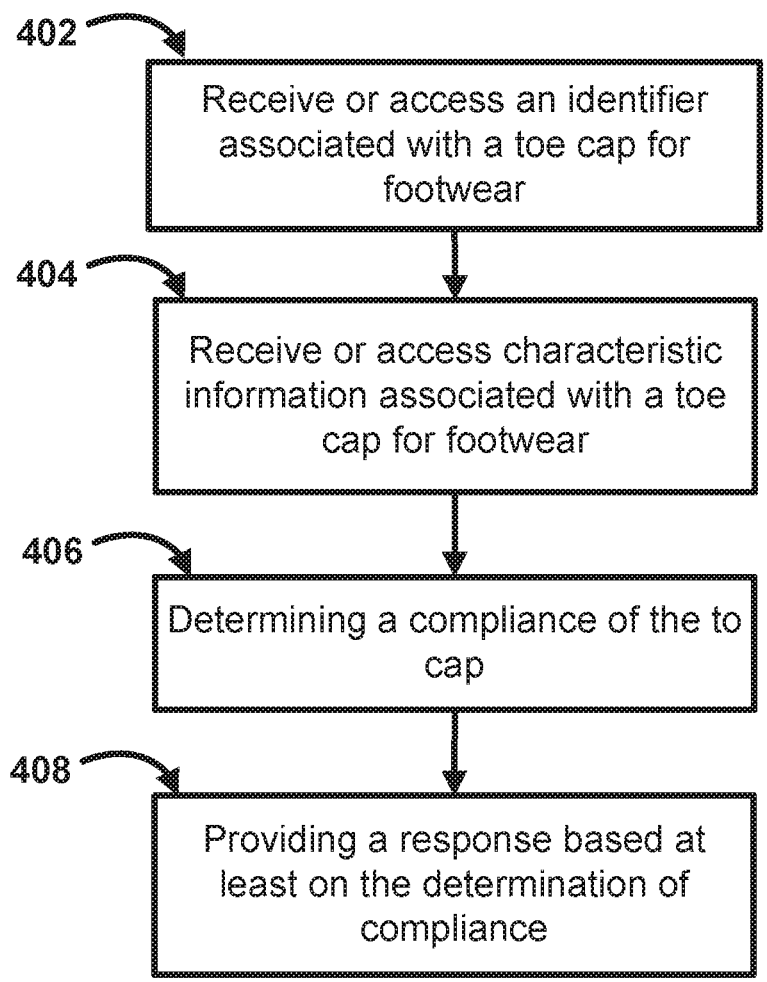
FIG. 4 is a flow chart of an example method in accordance with aspects of the disclosure.

FIG. 4 depicts example operating procedures that may be implemented by the systems and networks described hereon. For example, in reference to FIGS. 1-3, operation or step 402 may include receiving or accessing an identifier associated with apparel such as a toe cap for footwear. As an example, the identifier is received/accessed via radio frequency from an RFID tag disposed in the footwear. As another example, the identifier is received/accessed via a wireless communication channel.

In operation or step 404, characteristic information is received or accessed (e.g., via RF) associated with the toe cap for footwear. The characteristic information may be represented by an RF signal form generated from an antenna disposed in the footwear. In certain aspects, a compliance state such as a compromised condition of the toe cap is reflected in the signal form generated from the antenna.

In operation or step 404, compliance (e.g., compliance signature) of the toe cap is determined based at least on the identifier and the characteristic information. Determining the compliance may include compliance failure or meeting certain compliance standards. Determining the compliance comprises comparing the characteristic information to comparative information. As an example, the comparative information is selected based at least on the identifier. As a further example, comparative information may include signal forms or waveforms that represent various states of various antennas and associated apparel.

In operation or step 404, a response may be provided to a wearer of the footwear based at least upon the determination of the compliance. The response to the wearer may be or include one or more of audio feedback, visual feedback, and tactile feedback. The response to the wearer may indicate a notification to the wearer of the compliance, instructions to the wearer, a suggestion to alter the footwear, or a combination thereof. Other response may be provided based on the determination of compliance.

Those of skill will appreciate that the various illustrative logical blocks, modules, and algorithm steps described in connection with the aspects disclosed herein may be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the design constraints imposed on the overall system. Skilled persons may implement the described functionality in varying ways for each particular application, but such implementation decisions should not be interpreted as causing a departure from the scope of the invention. In addition, the grouping of functions within a module, block, or step is for ease of description. Specific functions or steps may be moved from one module or block without departing from the invention.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An exemplary storage medium may be coupled to the processor such that the processor may read information from, and write information to, the storage medium. In the alternative, the storage medium may be integral to the processor. The processor and the storage medium may reside in an ASIC.

In at least some aspects, a processing system (e.g., electronic control system or devices 104, 120) that implements a portion or all of one or more of the technologies described herein may include a general-purpose computer system that includes or is configured to access one or more computer-accessible media.

Figure 5:
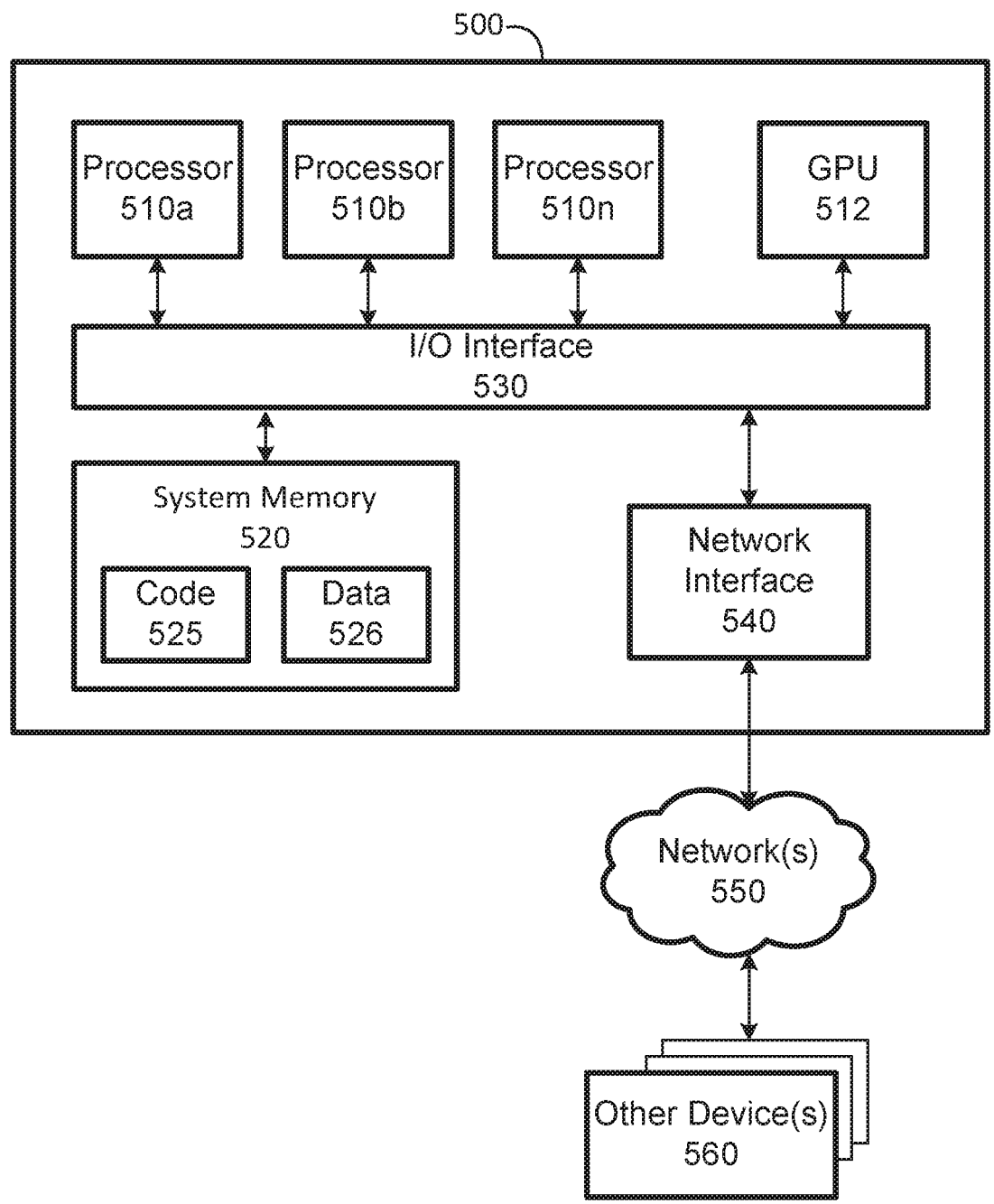
FIG. 5 is a block diagram of a computer system configured to implement the method of FIG. 4.

FIG. 5 depicts a general-purpose computer system that includes or is configured to access one or more computer-accessible media. In the illustrated aspect, computing device 500 includes one or more processors 510a, 510b, and/or 510n (which may be referred herein singularly as a processor 510 or in the plural as the processors 510) coupled to a system memory 520 via an input/output (I/O) interface 530. Computing device 500 further includes a network interface 540 coupled to I/O interface 530.

In various aspects, computing device 500 may be a uniprocessor system including one processor 510 or a multiprocessor system including several processors 510 (e.g., two, four, eight, or another suitable number). Processors 510 may be any suitable processors capable of executing instructions. For example, in various aspects, processor(s) 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

In some aspects, a graphics processing unit ("GPU") 512 may participate in providing graphics rendering and/or physics processing capabilities. A GPU may, for example, include a highly parallelized processor architecture specialized for graphical computations. In some aspects, processors 510 and GPU 512 may be implemented as one or more of the same type of device.

System memory 520 may be configured to store instructions and data accessible by processor(s) 510. In various aspects, system memory 520 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within system memory 520 as code 525 and data 526.

In one aspect, I/O interface 530 may be configured to coordinate I/O traffic between processor(s) 510, system memory 520 and any peripherals in the device, including network interface 540 or other peripheral interfaces. In some aspects, I/O interface 530 may perform any necessary protocol, timing or other data transformations to convert data signals from one component (e.g., system memory 520) into a format suitable for use by another component (e.g., processor 510). In some aspects, I/O interface 530 may include support for devices attached through various types of peripheral buses, such as a variant of the Peripheral Component Interconnect (PCI) bus standard or the Universal Serial Bus (USB) standard, for example. In some aspects, the function of I/O interface 530 may be split into two or more separate components, such as a north bridge and a south bridge, for example. Also, in some aspects some or all of the functionality of I/O interface 530, such as an interface to system memory 520, may be incorporated directly into processor 510.

Network interface 540 may be configured to allow data to be exchanged between computing device 500 and other device or devices 560 attached to a network or networks 550, such as other computer systems or devices, for example. In various aspects, network interface 540 may support communication via any suitable wired or wireless general data networks, such as types of Ethernet networks, for example. Additionally, network interface 540 may support communication via telecommunications/telephony networks, such as analog voice networks or digital fiber communications networks, via storage area networks, such as Fibre Channel SANs (storage area networks), or via any other suitable type of network and/or protocol.

In some aspects, system memory 520 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g., SDRAM, DDR SDRAM, RDRAM, SRAM, etc.), ROM, etc., that may be included in some aspects of computing device 500 as system memory 520 or another type of memory. Further, a computer-accessible medium may include transmission media or signals, such as electrical, electromagnetic or digital signals, conveyed via a communication medium, such as a network and/or a wireless link, such as those that may be implemented via network interface 540. Portions or all of multiple computing devices, such as those illustrated in FIG. 5, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, datastore servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The preceding detailed description is merely exemplary in nature and is not intended to limit the invention or the application and uses of the invention. The described aspects are not limited to use in conjunction with a particular type of machine. Hence, although the present disclosure, for convenience of explanation, depicts and describes particular machine, it will be appreciated that the track roller assembly and electronic control system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A method for managing compliance of apparel, the method comprising:
   receiving an identifier associated with a toe cap for footwear;
   receiving, via radio frequency, characteristic information associated with the toe cap for footwear, wherein the toe cap comprises an antennae configured to provide a first signal response when the toe cap in functioning properly and to provide a second signal response indicative of a compromised state of a physical characteristic of the toe cap;
   determining a compliance of the toe cap based at least on the identifier and the characteristic information; and
   providing a response to a wearer of the footwear based at least upon the determination of the compliance.

2. The method of claim 1, wherein the identifier is received via radio frequency from an RFID tag disposed in the footwear.

3. The method of claim 1, wherein the identifier is received via a wireless communication channel.

4. The method of claim 1, wherein the characteristic information is represented by an RF signal form generated from an antenna disposed in the footwear.

5. The method of claim 4, wherein a compromised condition of the toe cap is reflected in the signal form generated from the antenna.

6. The method of claim 1, wherein determining the compliance comprises comparing the characteristic information to comparative information.

7. The method of claim 6, wherein the comparative information is selected based at least on the identifier.

8. The method of claim 1, wherein the response to the wearer comprises one or more of audio feedback, visual feedback, and tactile feedback.

9. The method of claim 1, wherein the response to the wearer indicates a notification to the wearer of the compliance, instructions to the wearer, a suggestion to alter the footwear, or a combination thereof.

10. A compliance management system comprising:
    a memory comprising one or more compliance rules and processor executable instructions;
    a processor in communication with the memory, the processor configured to:
      receive an identifier associated with a toe cap for footwear;
      receive, via radio frequency, characteristic information associated with the toe cap for footwear, wherein the toe cap comprises an antennae configured to provide a first signal response when the toe cap in functioning properly and to provide a second signal response indicative of a compromised state of a physical characteristic of the toe cap;
      determine a compliance of the toe cap based at least on the identifier and the characteristic information; and
      provide a response to a wearer of the footwear based at least upon the determination of the compliance.

11. The compliance management system of claim 10, wherein the identifier is received via radio frequency from an RFID tag disposed in the footwear.

12. The compliance management system of claim 10, wherein the identifier is received via a wireless communication channel.

13. The compliance management system of claim 10, wherein the characteristic information is represented by an RF signal form generated from an antenna disposed in the footwear.

14. The compliance management system of claim 13, wherein a compromised condition of the toe cap is reflected in the signal form generated from the antenna.

15. The compliance management system of claim 10, wherein determining the compliance comprises comparing the characteristic information to comparative information.

16. The compliance management system of claim 15, wherein the comparative information is selected based at least on the identifier.

17. The compliance management system of claim 10, wherein the response to the wearer comprises one or more of audio feedback, visual feedback, and tactile feedback.

18. The compliance management system of claim 10, wherein the response to the wearer indicates a notification to the wearer of the compliance, instructions to the wearer, a suggestion to alter the footwear, or a combination thereof.

19. The compliance management system of claim 10, wherein the compliance rule indicates a safety compliance for the toe cap.

20. The compliance management system of claim 10, wherein the compliance rule indicates a compromised state threshold for the toe cap.

* * * * *